Sept. 12, 1933.

C. ANDREWS

Re. 18,945

STRAINER

Original Filed Aug. 9, 1930

Inventor:

By Charles Andrews

Wilson, Dowell, McCanna & Rehm

Attys.

Reissued Sept. 12, 1933 Re. 18,945

UNITED STATES PATENT OFFICE 18,945

STRAINER

Charles Andrews, Rockford, Ill., assignor to The Washburn Company, Worcester, Mass., a corporation of Massachusetts Original No. 1,874,410, dated August 30, 1932, Serial No. 474,231, August 9, 1930. Application for reissue February 20, 1933. Serial No. 657,656

8 Claims. (Cl. 210—161)

This invention relates to strainers, and has particular reference to a strainer for a food press and ricer adapted to handle vegetables, fruits, and the like.

The principal object of my invention is to provide a utensil for all around use of sturdy, durable, and economical construction, and made of the fewest possible number of parts which are, furthermore, adapted to be taken apart quickly and easily to facilitate cleaning thereof, and so as also to permit of the substitution of a bowl of one mesh screen for another bowl to meet any requirement.

The food press is made up of four parts, namely, the screen bowl or hopper, the supporting frame therefor, in which the same is arranged to be detachably mounted, and the roller or food extractor for cooperation with the bowl having a one-piece wire holder in which the roller is detachably mounted. The bowl supporting frame is made of wire to a special form which permits resting the utensil on a suitable dish in the use thereof, the special form of the frame also lending the requisite degree of resilience which permits firmly securing the bowl in the frame while still having the same quickly and easily detachable.

The invention is illustrated in the accompanying drawing, in which—

The same reference numerals are applied to corresponding parts throughout the views.

Figure 1:
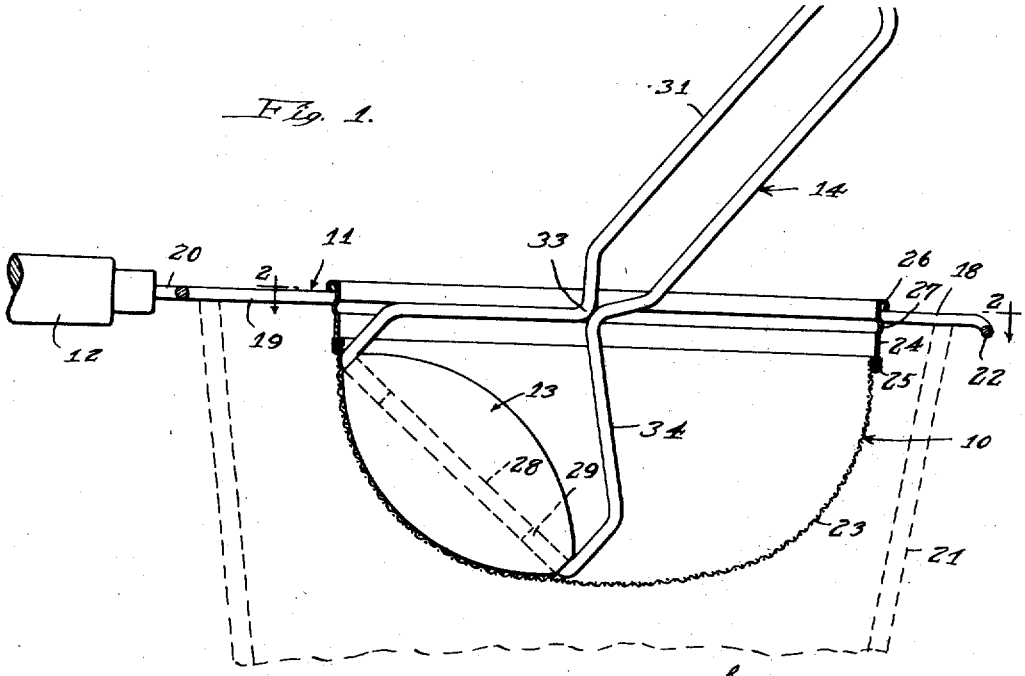
Figure 1 is a longitudinal vertical section through the utensil of my invention, indicating in dotted lines how the same is adapted to rest on the rim of a bowl or other dish during use.

Referring to the parts generally, the food press comprises a strainer made up of a screen bowl or hopper 10 mounted in a frame 11 provided with a handle 12, and a presser made up of a roller 13 carried on a holder 14. The frame 11 for the strainer, in accordance with my invention, is made from a single piece of wire bent so as to form complemental arcuate portions 15, which together approximate a circle for reception of the bowl 10, but are bent outwardly at two laterally spaced points 16 at one side of the circle and at two other laterally spaced points 17 at the diametrically opposite side so as to form substantially U-shaped projecting toe and heel portions 18 and 19, respectively. The ends of the wire are bent rearwardly from the heel portion 19, as indicated at 20, and entered in the handle 12, so that the latter provides a grip for the strainer. The ends of the wire are preferably twisted or otherwise joined together to form a solid shank for entry in the handle. It will be observed that the wire enters the handle far enough to bring the ferrule on the handle into such close proximity with the heel portion 19 as to prevent displacement of said ferrule from said handle. In many utensils, where no such precaution is taken, the ferrule works loose and it is quite an annoyance to have to replace it on the handle practically every time the utensil is used. The toe and heel portions are adapted to support the utensil on the rim of a suitable dish or other receptacle 21. The said toe and heel portions are of sufficient length so that the utensil will fit a reasonably large range of sizes of dishes. The front end of the toe portion 18 is bent downwardly, as indicated at 22 in Fig. 1, for abutment with the outside of the rim to keep the utensil from dropping down in the pan at that end, and the handle 12 constitutes a sufficient projection at the rear end of the heel portion 19 to serve by abutment with the outside of the rim of the dish to keep that end of the utensil in place. The screen bowl 10 comprises a screen 23 held in a circular sheet metal frame 24 by the crimping of the lower edge 25 thereon in the usual manner. The upper edge of the sheet metal frame 24 is rolled so as to provide an outwardly projecting rim 26, and slightly below this rim an annular, outwardly projecting bead 27 is provided. The wire frame 11 is arranged to have the arcuate portions 15 thereof fit on the frame 24 between the rim 26 and bead 27. In order, however, that the frame 11 will hug the frame 24, the portions 15, which, of course, aggregate less than 360°, normally occupy a position within concentricity, as indicated in dotted lines at *a* in Fig. 2. Then, as the frame 11 is forced over the bead 27, as the resilience of the toe and heel portions 18 and 19 permits, the portions 15 are spread to a position beyond concentricity, as indicated in dotted lines at *b* in Fig. 2. Hence, after the portions 15 have passed over the bead 27, and contract so as to fit between the bead and the rim 26, and are disposed substantially concentric with one another and with the frame 24, the portions 15, by reason of the inherent resilient of the frame, grip the frame 24 tightly enough to keep the bowl from turning around or coming out. The bowl may, however, be removed quickly and easily when desired, either for the purpose of cleaning the utensil, or when a bowl having a different mesh screen is to be used. Thus, a bowl having a screen of a mesh suitable for ricing potatoes would not be suitable for straining grape juice or for some other purpose, and, for that reason, it is contemplated to sell the utensil with a suitable number of screen bowls of different meshes to meet any requirements. The bowls will, of course, have the same size sheet metal frame 24, formed in the manner above described, so that each bowl will fit in the wire frame 11, as described.

Figure 2:
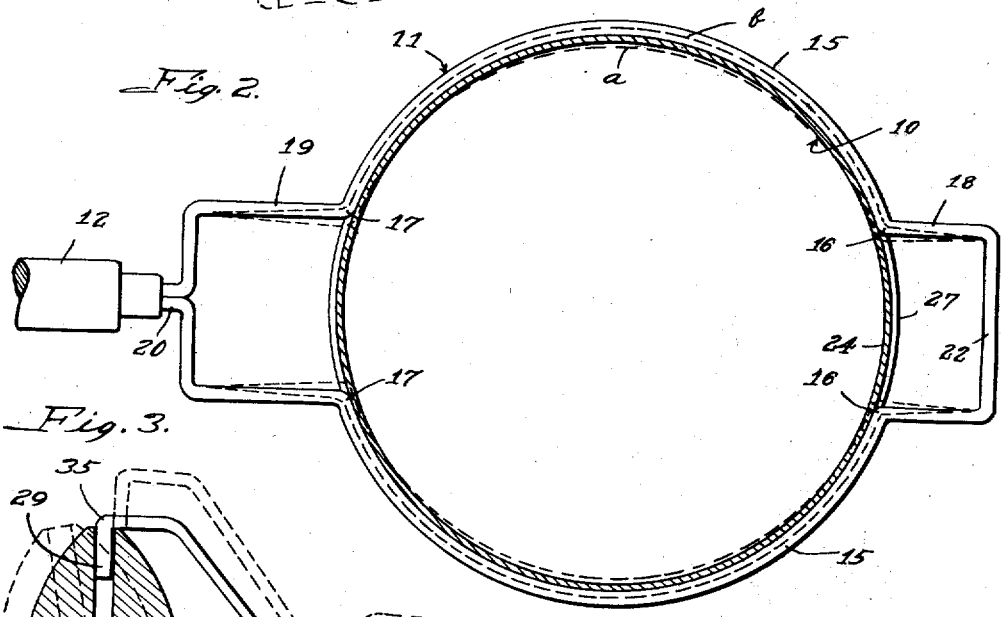
Fig. 2 is a horizontal section on the line 2—2 of Figure 1 showing the frame in plan, the latter also having its normal and its spread condition indicated in dotted lines.
Figure 3:
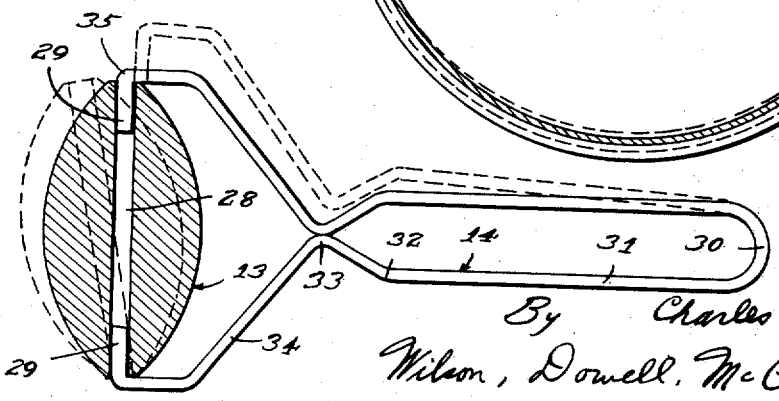
Fig. 3 is a view of the roller and handle, the same being shown also in dotted line positions, indicating the method of assembling and disassembling.

The roller 13 and holder 14, and the combination of the roller and screen bowl, form the subject matter of a divisional application, Serial No. 573,559½, filed November 7, 1931. The roller 13 is of elongated, approximately ellipsoidal form, the surface thereof being arcuate and conforming to the shape of the inside of the bowl 10 so as to operate in the latter with a rolling action, as indicated in Fig. 1, to press the substance being operated upon through the screen. The roller has an axial hole 28 drilled through it for reception of the trunnions 29 of the holder 14 on which the roller is mounted for rotation. The holder 14 is formed from a single piece of heavy wire bent intermediate the ends thereof, as at 30, to form a narrow elongated U-shaped handle 31. The sides of the U are bent inwardly toward each other, as at 32, at the front end of the handle 31 to provide abutting portions 33, and are then bent outwardly in diverging relation to one another to provide the yoke portion 34. The free ends of the wire are bent inwardly toward one another, as at 35, to provide the trunnions 29 on the yoke. The wire of the holder 14 has sufficient resilience to permit spreading thereof from the full line position shown in Fig. 3 to the dotted line position, whereby to disengage the one trunnion 29 from the hole 28 for removal of the roller 13 from the holder. By reason of the special forming of the holder, is is obvious that a spread of the yoke 34 sufficient to disengage or reengage one of the trunnions 29 does not call for much flexing at the bend 30, due to the remoteness of the bend with refernece to the trunnions. Hence, since the wire holder does not have to be spread anywhere near the elastic limit, the roller can be removed and replaced as often as necessary and the holder will always stay the same and give the same satisfactory service. The facility with which the roller can be removed and replaced is, of course, a great advantage since it permits thoroughly cleaning the parts. The fact that the sides of the handle 31 are bent into abutment at 33 prevents contraction of the yoke 34, and the roller 13 is, therefore, always free for easy operation. In other words, it makes no difference how tightly one grips the handle 31. The abutment at 33 also prevents needless flexing of the wire at 30 in the gripping of the handle, which might otherwise in the course of time result in fatigue at the bend and possibly breakage.

It is believed the foregoing description conveys a clear understanding of all of the objects and advantages of my invention. It should be understood that while I have disclosed a screen bowl or hopper, the same might be formed of perforated sheet metal or of any other foraminous material, and while the same has been disclosed as of a semi-spherical form, it might be made in other forms. Then, too, while the utensil is adapted for use as a food press and ricer, it is in reality a combination of handy utensils, since the screen bowl or hopper makes a splendid strainer or colander when used alone. The extracting and straining functions of the utensil are thought to be self-evident; the juice or other substance is arranged to pass through the screen, and the skins and seeds will remain in the bowl. The rolling action of the roller on the inside of the bowl presses out or extracts the last vestige of food or juice and reduces the amount of waste to a minimum.

I claim:

1. In a strainer comprising a bowl having a circular supporting rim, a one-piece wire supporting frame bent to provide complemental arcuate portions at opposite sides thereof defining a ring for reception of the rim of the bowl, and, at diametrically opposite sides of the ring, a projecting substantially U-shaped toe portion and a projecting substantially U-shaped heel portion to rest on the rim of a suitable receptacle, the ends of the wire being bent outwardly at the back of the heel portion so as to close the frame at that point, and a handle for said frame having the ends of said wire entered therein, whereby to serve as a hand grip for the frame, said U-shaped toe and heel portions serving to provide broad supports for the bowl for steady rest on the receptacle.

2. In a strainer comprising a bowl having a circular supporting rim, a one-piece wire frame for supporting the bowl and adapted to receive the supporting rim of said bowl, and a handle having the ends of the wire of said frame entered therein to mount the handle on the frame, said wire being bent in the form of a ring for reception of the rim of the bowl, and being further bent to provide a projecting substantially U-shaped heel portion between the ring and handle to rest on the rim of a suitable receptacle, said U-shaped heel portion serving to provide a broad support for the bowl for steady rest on the receptacle.

3. In a strainer comprising a bowl having a circular supporting rim, a one-piece wire supporting frame bent to provide complemental arcuate portions defining a ring for reception of the rim of the bowl, and, at a plurality of circumferentially spaced points of the ring, substantially U-shaped projecting portions to rest on the rim of a suitable receptacle, the ends of the wire being bent outwardly at a certain point with respect to the ring to close the frame at that point, and a handle for said frame having the ends of said wire entered therein, whereby to mount the handle on the frame, said U-shaped portions serving to provide broad supports for the bowl for steady rest on the receptacle.

4. In a strainer comprising a bowl having a circular supporting rim, a one-piece wire frame for supporting the bowl and adapted to receive the supporting rim of said bowl, and a handle having the ends of the wire of said frame entered therein to mount the handle on the frame, said wire being bent in the form of a ring for reception of the rim of the bowl, and being further bent to provide a projecting substantially U-shaped heel portion between the ring and handle to rest on the rim of a suitable receptacle, and a ferrule on the inner end of said handle through which the ends of the wire are passed to enter the handle, said handle having the ends of the wire entered therein far enough to bring the ferrule in such close proximity with the heel portion of the frame, whereby to prevent displacement of the ferrule from the handle.

5. In a strainer comprising a bowl having a circular supporting rim, a one-piece wire supporting frame bent to provide complemental arcuate portions at opposite sides thereof defining a ring for reception of the rim of the bowl, and, at diametrically opposite sides of the ring, a projecting substantially U-shaped toe portion and a projecting substantially U-shaped heel portion to rest on the rim of a suitable receptacle, the ends of the wire bent outwardly at the back of the heel portion so as to close the frame at that point, a handle for said frame having the ends of said wire entered therein, whereby to serve as a hand grip for the frame, and a ferrule on the inner end of said handle through which the ends of the wire are passed to enter the handle, said handle having the ends of the wire entered therein far enough to bring the ferrule in such close proximity with the heel portion of the frame whereby to prevent displacement of the ferrule from the handle.

6. In a strainer comprising a bowl having a circular supporting rim, a one-piece wire supporting frame bent to provide complemental arcuate portions at opposite sides thereof defining a ring for reception of the rim of the bowl, and, at diametrically opposite sides of the ring, a projecting substantially U-shaped toe portion and a projecting substantially U-shaped heel portion to rest on the rim of a suitable receptacle, the ends of the wire being bent outwardly at the back of the heel portion to close the frame at that point and provide a handle portion, said U-shaped toe and heel portions constituting supports for the bowl adapted to rest on the rim of a receptacle.

7. In a strainer comprising a bowl having a circular supporting rim, a one-piece wire frame for supporting the bowl having the wire thereof bent in the form of a ring for reception of the rim of the bowl, and also bent to provide a projecting substantially U-shaped heel portion, the ends of the wire of said frame being bent outwardly from the heel portion to close the frame at that point and provide a handle portion, said U-shaped heel portion constituting a support for the bowl adapted to rest on the rim of a receptacle.

8. In a strainer comprising a bowl having a circular supporting rim, a one-piece wire supporting frame bent to provide complemental arcuate portions defining a ring for reception of the rim of the bowl, and, at a plurality of circumferentially spaced points of the ring, substantially U-shaped projecting portions to rest on the rim of a suitable receptacle, the ends of the wire of said frame being bent outwardly at a certain point with respect to the ring to close the frame at that point and provide a handle portion, said U-shaped portions constituting supports for the bowl adapted to rest on the rim of a receptacle.

CHARLES ANDREWS.